Feb. 2, 1954　　　　S. G. TILDEN　　　　2,667,923
GAUGE FOR BRAKE LINING CUTTERS
Filed April 11, 1950　　　　2 Sheets-Sheet 1
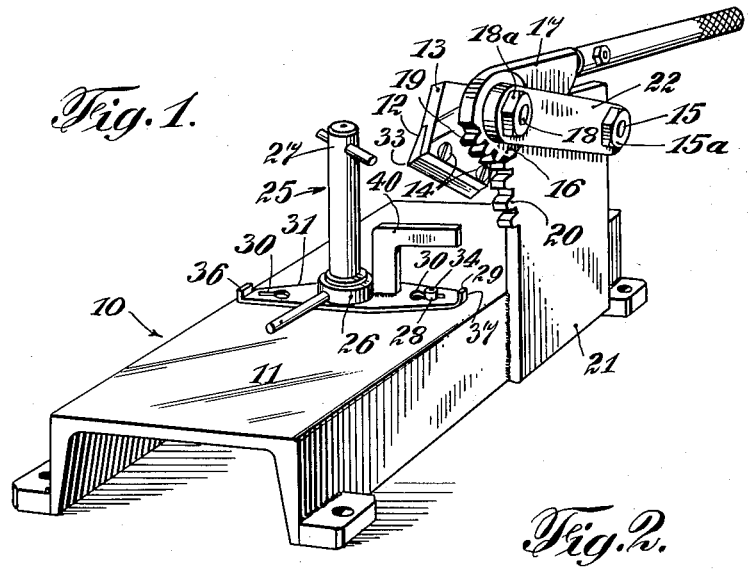
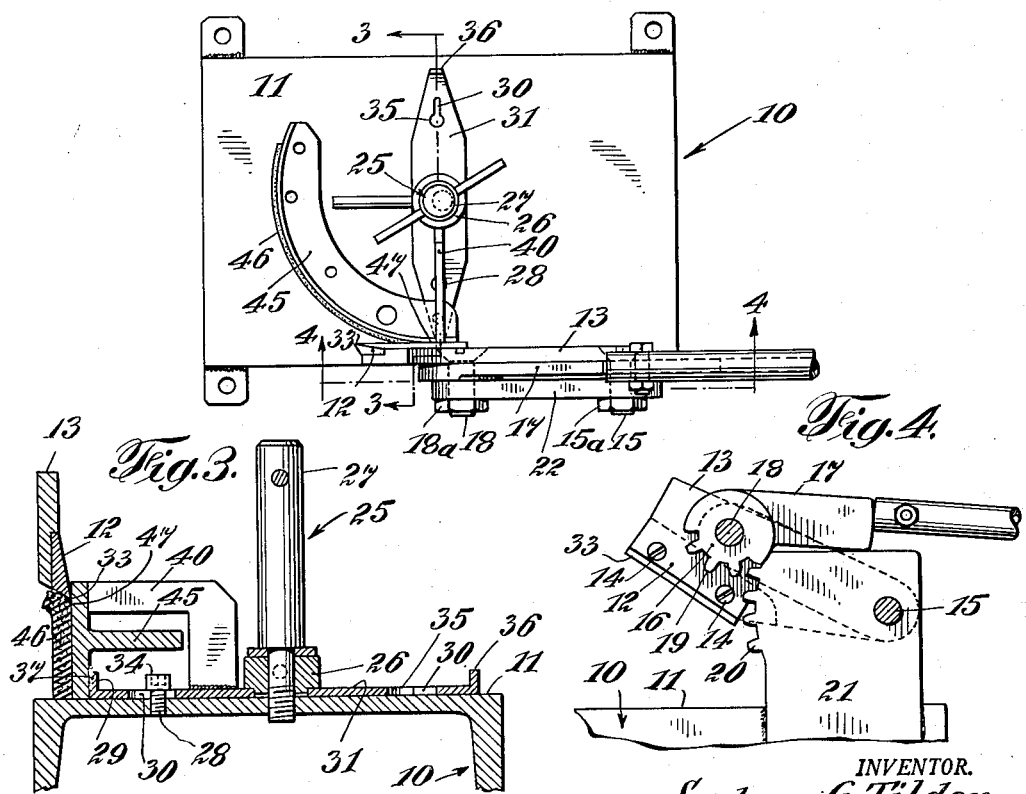
INVENTOR.
Sydney G. Tilden
BY
C. P. Goepel
his ATTORNEY Feb. 2, 1954 S. G. TILDEN 2,667,923
GAUGE FOR BRAKE LINING CUTTERS
Filed April 11, 1950 2 Sheets-Sheet 2

INVENTOR.
Sydney G. Tilden
BY O. P. Goepel
his ATTORNEY

Patented Feb. 2, 1954

2,667,923

UNITED STATES PATENT OFFICE 2,667,923

GAUGE FOR BRAKE LINING CUTTERS

Sydney G. Tilden, Stewart Manor, N. Y., assignor to The Permafuse Corp., Garden City, N. Y., a corporation of New York Application April 11, 1950, Serial No. 155,280

1 Claim. (Cl. 164—59)

This invention relates to devices for cutting brake linings, either separately or as part of the removal of a brake lining which has been secured to the brake shoe by bonding with thermo-setting adhesives or by other means of adhesive attachment.

The removal of worn out brake lining which has been bonded to the brake shoe preparatory to relining has been very difficult and has proved to be an expensive and time consuming job. Various methods have been employed for this purpose and various devices have been developed but each such method and/or device has had serious drawbacks from either the standpoint of original cost or cost of operation.

One object of the invention is to provide a device for the removal of a brake lining which has been bonded or otherwise adhesively attached to a brake shoe, and which is relatively inexpensive to construct, cheap to operate, is portable, and yet fast in doing the job, and which does not require electrical or mechanical power to operate, nor the use of highly caustic or otherwise dangerous chemicals, dust removal equipment, or subjection of the brake shoe to high temperatures which may readily cause permanent distortion.

The present invention consists of a horizontal flat base plate on which the brake shoe or brake lining is placed, a cutting blade positioned to be manually operated up and down in a vertical plane, and an adjustable guide to position the brake shoe with respect to the cutting blade so that the cutting blade is inserted at the bond line and at the point of tangency between the curved brake shoe brake lining adhering surface and the cutting blade, or to position the brake lining to be cut.

The invention will be further described, embodiments shown in the drawings, and the invention will be finally pointed out in the claim.

In the accompanying drawings,

Fig. 1 is a perspective view of the improved machine;

Fig. 2 is a plan view of Fig. 1;

Fig. 3 is a vertical section on line 3—3 of Fig. 2;

Fig. 4 is a vertical sectional view taken on line 4—4 of Fig. 2;

Similar characters of reference indicate corresponding parts throughout the various views.

Figure 5:
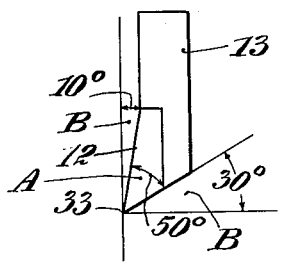
Fig. 5 is a diagrammatic end view of the knife.
Figure 6:
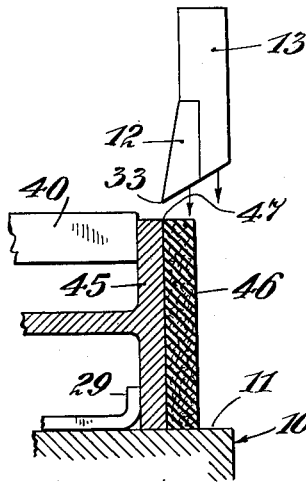
Fig. 6 is a similar view showing the brake shoe and lining in relation to the knife.

Referring to Fig. 1, a table 10 has a flat horizontal surface 11 on which the brake shoe is to be positioned. A cutting blade 12 has a knife edge 33 and is attached to arm 13 by means of screws 14. The arm 13 is pivoted to rotate about the fulcrum pin 15 held by a nut 15a and is actuated by means of pinion 16 which is rigidly attached to lever arm 17 and which rotates on pin 18 held by a nut 18a. The pinion 16 has gear teeth 19 which mesh with mating gear teeth 20 on a supporting bracket 21 rigidly attached to table 10. Connecting link 22 is parallel to arm 13 and is pivotally connected with the pins 18 and 15.

The guide 25 is adjustably disposed on base plate 10 and is positioned by eccentric adjustment 26 which is locked by hand screw 27. The pin 28 serves to position the cutting blade end 29 of the guide 25 and the keyhole slots 30 in the guide plate 31, permit the guide plate 31 to be moved toward or away from the cutting knife edge blade 33 by actuation of the eccentric adjustment 26. Pin 28 has a head 34 which prevents the guide plate 31 from raising up as the cutting blade 12 is retracted. Slot 30 in the guide plate 31 is keyhole shaped and has a large hole portion 35.

The guide plate 31 is double ended and has lips 36 and 37 at each end, one of which contacts the lower portion of the brake shoe flange. One end of the guide plate 31 has a top guide 40 which contacts the top portion of the brake shoe flange. Reversal of the guide plate 31 is accomplished by removing the hand screw 27 and eccentric adjustment 26 sliding the guide plate 31 toward the cutting blade 12 until the large hole 35 in the keyhole slot 30 lines up with the head 34 of pin 28, turning the guide plate 31 end to end and repeating in reverse order the steps enumerated for removal.

The cutting blade 12 is made of oil hardening tool steel, hardened and tempered to between Rockwell C-55 and C-56 hardness which has been found to give sufficient hardness to permit extended use without sharpening and yet is not so brittle as to chip or fracture, if contact with the metallic brake shoe is made by accident or maladjustment of the guide plate 31.

It has been found that the angle of the cutting blade as well as the angle between the cutting blade and the brake lining is highly important to the proper operation of the device and for best results it has been found that the angle A of the cutting blade should be 50 degrees and the angle B between the cutting blade and the vertical should be 10 degrees (see Fig. 5).

In operation, the brake shoe 45 from which the bonded lining 46 is to be removed, is set on its side on the base plate 10 with the lining toward the cutting blade 12. The hand screw 27 is loosened so as to permit rotation of the eccentric adjustment 26 which is adjusted so that the knife edge 33 of the cutting blade 12 just clears the brake shoe 45 at the point of tangency 47 (Figs. 2, 3, 6 and 7). The hand screw 27 is then tightened to lock the position of the eccentric adjustment 26 and the device is ready for operation. By pulling the lever arm 17 the operator forces the knife edge 33 of the cutting blade 12 down through the bond line between brake lining 46 and brake shoe 45 slicing off a piece of the brake lining 48 (Fig. 8).

Figure 7:
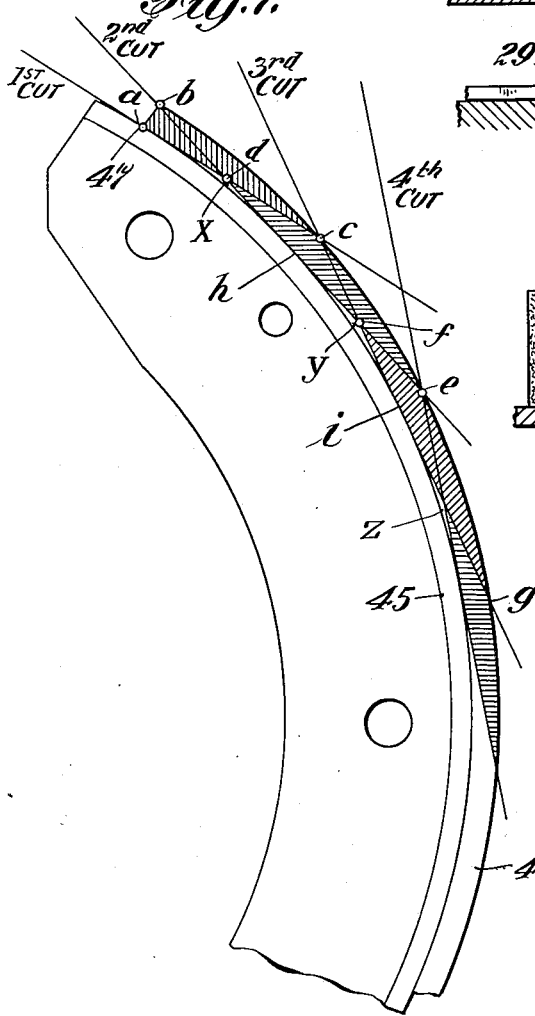
Fig. 7 is a diagrammatic side view of a brake shoe, showing the successive cutting actions.
Figure 8:
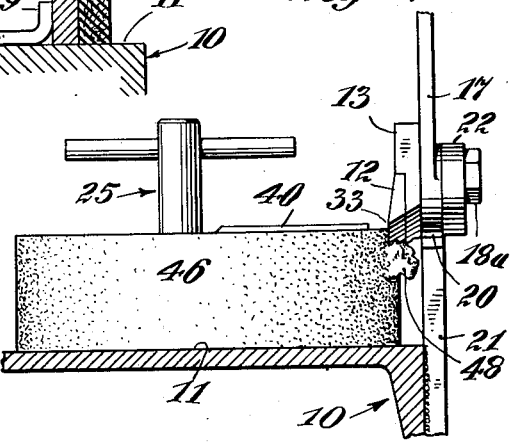
Fig. 8 is a front view of the lining, being operated upon by the knife.

Referring to Fig. 7, the guide is set and the brake lining positioned so that the cutting blade is tangent to the brake shoe at point a. The cutting blade will then chop off the lining segment bounded by a—b—c. The cutting blade is then retracted, the brake shoe moved or rotated by hand to a new position with the cutting blade tangent to the brake shoe at point h. A second stroke of the cutting blade will then chop off the lining segment bounded by d—c—e. The cutting blade is retracted, the brake shoe again rotated by hand so that the cutting blade is tangent to the brake shoe at point i and a third stroke of the cutting blade will chop off the lining segment bounded by f—e—g. This is repeated throughout the length of the brake lining, leaving only the small portions x, y, and z, still attached. These smaller portions are removed by successive chops of the cutting blade until the portions remaining are infinitesimal.

It has been found that the brake shoe may be rotated 15° to 20° for each major cut so that a bonded brake lining having the usual 110° to 120° of arc length, may be removed by six to seven major cuts, leaving only five to six unremoved smaller portions which may be readily and quickly removed by repetition of the above process.

The embodiment of the invention described presents an inexpensive, manually operated device which is fast in operation, and which does not have the objectional features of the other methods of de-lining heretofore proposed. The present invention as described hereinabove differs from the various methods heretofore used to remove bonded linings, which have included cutting off the lining with a hand chisel or chisel operated by a compressed air hammer, and hot caustic solutions to cause decomposition of the bonding or adhesive agent. The mechanical chipping off of the lining is a slow, time consuming and therefore expensive operation, and every attempt to attack the bonding agent by chemical solvents has been impractical because of the minute surface exposed to the action of the chemical.

Other devices heretofore proposed have included the use of abrasive sleeves or belts which grind off the lining to be removed by abrasive action. These devices not only require high horse power driving means which add greatly to the original cost, but the attrition of sanding sleeves or belts raises the cost of lining removal to a prohibitively high figure and furthermore, the operation is dusty and dust removal equipment is essential, thus increasing the original installation cost.

Another device which has been offered is a high temperature oven which subjects the brake shoe assemblies to temperatures high enough to cause disintegration of the brake lining and the bonding means. However, the temperature required for such action is in excess of 700° F. and the cost of heating the mass of brake shoe metal to this high temperature is a serious drawback. Furthermore, the brake shoes must be heated slowly and evenly to prevent permanent distortion and must also be cooled the same way, which adds greatly to the cost of handling and the inconvenience and time required for this method.

Thus it will be seen that there has heretofore been no successful device developed for this important operation, and the improvement disclosed herein overcomes the various objections pointed out.

A further problem encountered by mechanics when relining brakes in automobile repair shops, particularly in the relining of brakes by bonding the brake lining to the shoe with thermo-setting resins or other adhesive means of attachment, arises out of the necessity of cutting the new brake lining to proper length. In many cases, the new brake lining is supplied by the manufacturer in the form of hard molded segments already cut to length but lengths are invariably established by the length of the segment required for riveting the segment to the shoe and include chamfered or ramped portions at each end of the segment which extend from the end rivet holes to the segment end. When bonding such segments to the brake shoe, the chamfered or ramped portions should be cut off so that the segment end is square to act as a wiping edge to reject dust, dirt and other abrasive matter from entering between the braking surfaces of the lining and brake drum as the brakes are applied. A still further need for cutting brake lining arises from the quite common practice of the trade of using a semi-cured molded lining which is supplied by the manufacturer as a roll of a continuous strip of approximately 25 feet in length. Strips of the proper length for relining a given set of brake shoes, either by riveting or by bonding, must be cut from such a roll and unless shearing means is readily available, such cutting is usually done with a hack saw and is awkward and time consuming.

Figure 9:
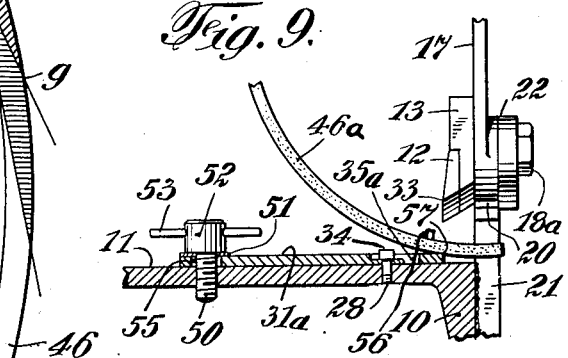
Fig. 9 is a vertical sectional elevation of a brake lining cutter, in which the knife acts as on the lining separately.

The improved knife device may be used for cutting a new brake lining 46a when placed in the position shown in Fig. 9. The parts 17, 13, 12, 33, 22, 18a, 20, 21, 28 and 34 are the same as heretofore described, as also the base plate 10 and horizontal surface 11. A guide plate 31a is adjustably disposed on the surface 11, and is held in position by the hand screw 52 which has a threaded portion 50 engaging threads in the plate 10, a washer 51 being disposed between the hand screw 52, which is not eccentrically actuated, having hand bars 53, and the upper surface of the guide plate 31a. The guide plate 31a is slotted as at 35a similar to the keyhole slots 30 in the guide 25 (Fig. 1). The head 34 of the pin 28 holds the guide plate 31a down. The guide plate 31a has an enlarged opening 35a, like 35 in Fig. 2, to enable disengagement to be had. The guide plate 31a has a hole 55 which is substantially larger than the threaded portion 50 of hand screw 52 but substantially smaller than the outside diameter of the washer 51 so that the guide plate 31a may be changed in position to bring its cutting edge 57 exactly in line with the knife edge 33, allowing for cutting clearance, and the guide plate 31a locked in place by tightening hand screw 52. The guide plate 31a has a guide pin 56 contacting the far edge of lining 46a. Pin 56 serves to position the lining 46a under the knife edge 33. The lining abuts against the pin 56, and is thus held securely for the cutting action. When the knife edge 33 descends it shears off the desired amount of the brake lining, the brake lining being held by the hand of the operator.

I wish it to be understood that I do not desire to be limited to the exact details of construction shown and described, for obvious modifications will occur to a person skilled in the art.

I claim:

In a brake lining cutter device having a horizontally disposed table and a hinged knife on said table, having its cutting edge facing said table and movable in a vertical plane, the combination of a plate on said table having a central opening, a flange on said plate forming part of said plate and extending upwardly of said plate and having a vertical exterior surface, a member secured to said plate and extending upwardly from said plate between the rear of said flange and said central opening, with a part extending horizontally and having a free end with a vertical exterior surface disposed in vertical alignment with the vertical exterior surface of said flange, both exterior surfaces being in a vertical plane and spaced vertically from each other about the width of a flange of a brake shoe, said vertical plane being spaced from one end of said table to allow a part of the table to be exposed free from said plate, a screw-threaded pin engaging said table and passing through said central opening of said plate, a fastening device above said plate and connected with said threaded pin for holding the plate in fixed position on the table, an eccentric adjusting means forming part of said fastening device for fine lateral adjustment of the plate in respect to said table, and a headed screw engaging the table and passing through an off center slot in said plate preventing rotary movement of said plate, whereby a brake shoe may be held in position on said table by the end of one of its flanges resting on said table, and with the inner surfaces of its flanges abutting said exterior surfaces of said flange and said horizontal member, and its web entering in the spacing between said surfaces and its brake lining surface substantially tangent to the vertical plane of the knife travel to enable the removal by said knife of any brake lining on said brake shoe surface.

SYDNEY G. TILDEN.

References Cited in the file of this patent

UNITED STATES PATENTS

| Number | Name | Date |
| --- | --- | --- |
| 186,262 | McAleer | Jan. 16, 1877 |
| 319,816 | Hoefer | June 9, 1885 |
| 745,531 | Sholes | Dec. 1, 1903 |